United States Patent [19]

Sorice et al.

[11] Patent Number: 6,030,427

[45] Date of Patent: Feb. 29, 2000

[54] REPLACEABLE AIR FILTER APPARATUS

[76] Inventors: James Sorice; Mark Sorice, both of 48 Blenheim Dr., Manhasset, N.Y. 11030

[21] Appl. No.: 09/114,700

[22] Filed: Jul. 13, 1998

[51] Int. Cl.[7] .................................................. B01D 25/00
[52] U.S. Cl. ............................... 55/480; 55/481; 55/492; 55/493; 55/508; 55/511; 55/DIG. 31; 55/DIG. 35; 55/DIG. 37
[58] Field of Search ............................. 55/480, 481, 490, 55/491, 492, 493, 495, 508, 511, DIG. 31, DIG. 35, DIG. 37

[56] References Cited

U.S. PATENT DOCUMENTS

| | | | |
|---|---|---|---|
| 943,298 | 2/1909 | Brown | 55/DIG. 35 |
| 1,616,297 | 2/1927 | Alber | 55/DIG. 35 |
| 1,726,792 | 9/1929 | Altman et al. | 55/DIG. 35 |
| 1,801,949 | 4/1931 | Broudy et al. | 55/DIG. 35 |
| 1,914,397 | 6/1933 | Bender | 55/DIG. 35 |
| 5,176,570 | 1/1993 | Liedl | 55/481 |
| 5,525,145 | 6/1996 | Hodge | 55/495 |
| 5,597,392 | 1/1997 | Hawkins et al. | 55/DIG. 35 |
| 5,863,310 | 11/1999 | Brown et al. | 55/493 |

*Primary Examiner*—David A. Simmons
*Assistant Examiner*—Minh-Chau T. Pham
*Attorney, Agent, or Firm*—Martin Sachs, Esq.

[57] ABSTRACT

A replaceable air filter apparatus suitable for filtering the air in the home includes a frame for affixing the apparatus to the house duct work associated with the heating and/or air conditioning system the frame includes a hinge disposed on one edge, which cooperates with a hinge disposed on a register that may control the flow of air through the duct work and may include adjustable shutters and a device for removably retaining a filter media. The register may be pulled away from the frame for inserting and removing the filter media disposed therein, when desired.

12 Claims, 2 Drawing Sheets

REPLACEABLE AIR FILTER APPARATUS

BACKGROUND OF THE INVENTION

1. Field of the invention

The present invention relates to filter systems, and more particularly, to a filter apparatus that utilizes a removable filter of various that removes harmful particulate from circulating air.

2. Discussion of the Relevant Art

The prior art abounds with devices that attempt to remove contaminant particles from air flowing through the forced air duct outlet, such as that disclosed in U.S. Pat. No. 5,597,392 issued to Hawkins et al. on Jan. 27, 1997. Another filter device is disclosed in U.S. Pat. No. 5,707,411 issued to Rodaway et al. These and other devices suffer from the shortcoming of requiring considerable effort in replacing the filter media when it becomes necessary to do so.

Therefore it is an object of the present invention to provide an apparatus that provides a simple method of replacing the filter disposed at the input and output registers of a heating and air conditioning system.

It is another object of the present invention to provide an apparatus that may be used on the input and output registers of a heating and air conditioning system.

It is a further object of the present invention to provide an apparatus that may utilize a filter media that is used with or without a frame.

Yet another object of the present invention is to provide a filter apparatus that has a simple structure and is easy to manufacture.

Still yet another object of the present invention is to provide a filter apparatus that may be utilized on new register installations as well as retrofitting old installations.

SUMMARY OF THE INVENTION

The present apparatus, according to the principles of the present invention, overcomes the shortcomings of the prior art by providing an apparatus that may be used on the input and output registers of heating and air conditioning systems and includes a replaceable air filter media placed at the input and output air ducts suitable for filtering the air in the home. The apparatus includes a frame for affixing the apparatus to the house duct work and includes a hinge disposed on one edge, which cooperates with a hinge disposed on a register that may control the flow of air through the duct work and may include adjustable shutters and a device for removably retaining a filter media. The register may be pulled away from the frame for inserting and removing the filter media disposed therein, when desired.

BRIEF DESCRIPTION OF THE DRAWINGS

In order that the invention may be more fully understood, it will now be described by way of example, with reference to the accompanying drawing in which.

DESCRIPTION OF THE PREFERRED EMBODIMENT

Figure 1:
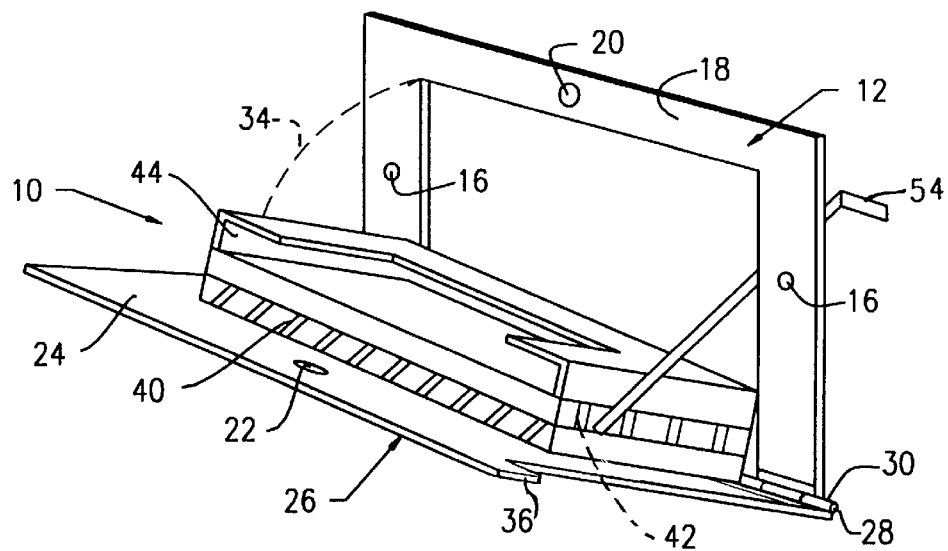
FIG. 1 is a pictorial representation, in perspective, partially broken away, of a replaceable air filter apparatus, according to the principles of the present invention, shown in the open position for replacement of a filter.

Referring now to the figures, and in particular to FIG. 1, there is shown a pictorial representation, in perspective, of a replaceable air filter apparatus 10, according to the principles of the present invention, shown in the open position for replacement of a filter. The filter apparatus 10 includes a frame 12 for affixing the apparatus 10 to the duct work 14 of a heating or air conditioning system, not shown, in a conventional manner, such as by screws not shown inserted into apertures 16 provided in the border 18 of the frame 12. The frame 12 may also include a magnet 20 disposed on the border 18 of the frame 12, adapted to cooperate with a magnet 22 disposed on the border 24 of the register 26. The frame 12 is provided with a hinge 28 disposed along one edge, which connects the frame 12 to the register 26 permitting movement therebetween in the direction of arrow 32, to open the apparatus 10 and arrow 34 to close the apparatus 10.

Register 26 is provided with a pulling mechanism such as an extending tab 36 or knob, not shown, disposed on the border 24 of the register 26.

Figure 2:
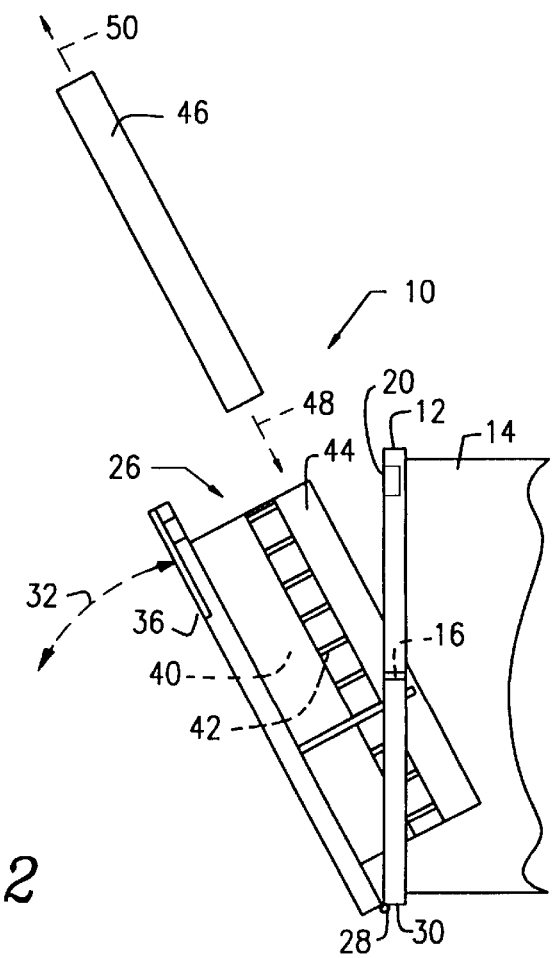
FIG. 2 is an end view, in elevation, showing the apparatus of FIG. 1 installed into an air duct.
Figure 3:
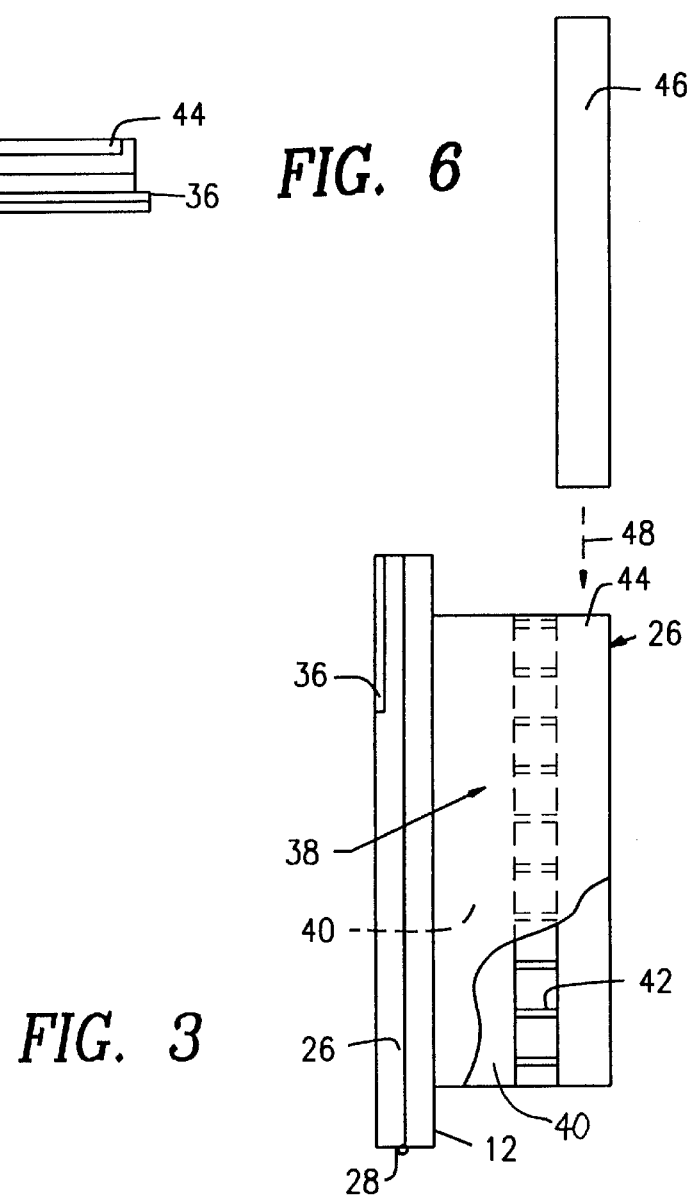
FIG. 3 is an end view, in elevation, of the register portion of the apparatus shown in FIG. 1, showing the position of the register for inserting a filter therein.

Referring now to FIGS. 2 and 3, it can be seen that the register 26 includes three portions; the first or downstream portion contains the vertical shutter vanes 40, the second or middle portion contains the horizontal shutter vanes 42, both of which control the air flow through the duct, and the third or upstream portion, which is a channel 44 suitable for receiving a filter media therein that is inserted into the channel in the direction of arrow 48 and removed therefrom in the direction of arrow 50.

Figure 4:
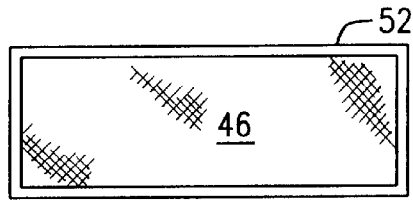
FIG. 4 is a greatly reduced front view, in elevation, of a filter, which may be used in the apparatus shown in FIG. 1.
Figure 5:
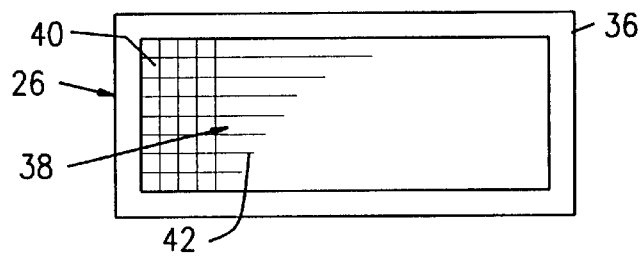
FIG. 5 is a greatly reduced front view of the shutter portion of the register shown in FIG. 3.
Figure 6:
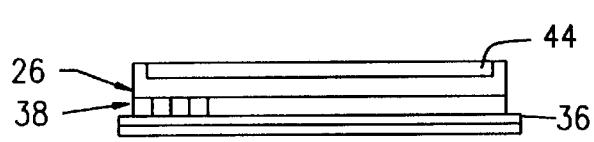
FIG. 6 is a greatly reduced top plan view of the register portion of the apparatus shown in FIG. 1, showing the position of the several portions of the register.

Referring now to FIGS. 4, 5, and 6 there is shown the front view of the filter 46, which is provided with a frame 52 to stiffen the filter material if need be. However, for certain types of filter material a frame 52 may not be required. The vanes 40 and 42 are mounted and positioned in a conventional manner and the location thereof is shown in FIG. 6. The filter media 46 may be replaced at prescribed intervals or washed and reused depending on the filter media utilized.

A stop bar 54 may be used to adjust the amount of forward movement of the register 26 from the frame 12, if desired.

It is to be noted that although the preferred embodiment described hereinbefore discloses the hinge 28 positioned on the bottom edge of the register 26 and the frame 12, it is contemplated that it may be affixed along any edge and it would still be suitable for proper operation of the apparatus 10.

It also should be noted that, although only the embodiment wherein the air flow exits the register is disclosed (by positioning the vanes 40 and 42 of the shutter portion 38 after the filter media 46), the positions thereof may be reversed (or the shutter portion eliminated altogether) and the filter may be conveniently utilized at the air intakes of an air conditioning and/or heating system.

Hereinbefore has been disclosed a replaceable air filter apparatus for filtering the intake air and/or exiting air of heating and air conditioning systems. It will be understood that various changes in the detail, materials, arrangements of parts and operating conditions, which have been herein described and illustrated in order to explain the nature of the invention may be made by those skilled in the art within the principles and scope of the instant invention.

Having thus set forth the nature of the invention, what is claimed is:

1. A replaceable air filter apparatus comprising, in combination:
   A. a frame for affixing the filter apparatus to the duct work of a forced air system, said frame having a hinge means disposed on one edge thereof;
   B. register means for controlling the flow of air through said duct work, said register means including;
      a) adjustable shutters,
      b) means for removably retaining a filter therein disposed upstream from said adjustable shutters, and
      c) mating hinge means disposed along one edge of said register means for cooperating with said frame hinge means;
   wherein said register means is pulled away from said frame for inserting and removing said filter when desired.

2. A replaceable air filter apparatus according to claim 1, further including a filter means for insertion into said means for removably retaining a filter.

3. A replaceable air filter apparatus according to claim 2, wherein said filter means includes:
   a) a frame disposed within said means for removably retaining a filter; and
   b) a filter media disposed within said frame.

4. A replaceable air filter apparatus according to claim 1, further including a pulling means for ease in separating said frame from said register means.

5. A replaceable air filter apparatus according to claim 1, further including a magnet means disposed on said frame for cooperating with a mating magnet means disposed on said register means for holding said register means to said frame.

6. A replaceable air filter apparatus according to claim 1, wherein said adjustable shutters include one row of generally vertical shutters and one row of generally horizontal shutters.

7. A replaceable air filter apparatus according to claim 2, wherein said adjustable shutters are disposed in front of said filter means.

8. A replaceable air filter apparatus comprising, in combination:
   A. a frame for affixing the apparatus to the duct work of a forced air system, said frame having a hinge means disposed on one edge thereof;
   B. register means for controlling the flow of air through said duct work, said register means including;
      a) support means for supporting flexible filter media,
      b) means for removably retaining a filter therein disposed upstream from said register means, and
      c) mating hinge means disposed along one edge of said register means for cooperating with said frame hinge means;
   wherein said register means is pulled away from said frame for inserting and removing said filter when desired.

9. A replaceable air filter apparatus according to claim 8, further including a filter means for insertion into said means for removably retaining a filter.

10. A replaceable air filter apparatus according to claim 9, wherein said support means is disposed behind said filter means.

11. A replaceable air filter apparatus according to claim 9, wherein said filter means includes:
   a) a frame adapted to be received into said means for removably retaining a filter; and
   b) a filter media disposed within said frame.

12. A replaceable air filter apparatus comprising, in combination:
   A. a frame for affixing the apparatus to the duct work of a forced air system, said frame having;
      a) a hinge means disposed on one edge thereof, and
      b) means for affixing said frame to said duct work;
   B. register means for controlling the flow of air through said duct work, said register means including;
      a) adjustable shutters,
      b) means for removably retaining a filter therein disposed upstream from said adjustable shutters,
      c) mating hinge means disposed along one edge of said register means for cooperating with said frame hinge means, and
      d) pulling means disposed on said register means for ease in separating said frame from said register means;
   wherein said register means is pulled away from said frame for inserting and removing said filter when desired.

* * * * *